United States Patent
Heathman et al.

(10) Patent No.: US 6,379,456 B1
(45) Date of Patent: *Apr. 30, 2002

(54) FLOW PROPERTIES OF DRY CEMENTITIOUS AND NON-CEMENTITIOUS MATERIALS

(75) Inventors: James F. Heathman, Katy, TX (US); Baireddy R. Reddy, Duncan, OK (US); Ronald E. Sweatman, Montgomery; Sears T. Dealy, Longview, both of TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/547,277

(22) Filed: Apr. 11, 2000

Related U.S. Application Data

(63) Continuation-in-part of application No. 09/229,245, filed on Jan. 12, 1999, now Pat. No. 6,245,142.

(51) Int. Cl.$^7$ .............................................. C04B 24/04
(52) U.S. Cl. ...................... 106/724; 106/728; 106/810; 106/823
(58) Field of Search ............................. 106/724, 728, 106/810, 823

(56) References Cited

U.S. PATENT DOCUMENTS

| | | | |
|---|---|---|---|
| 2,609,882 A | 9/1952 | Morgan et al. ............... | 166/22 |
| 2,776,713 A | 1/1957 | Morgan et al. ............... | 166/22 |
| 2,857,286 A | 10/1958 | Striker ........................ | 106/90 |
| 2,880,102 A | 3/1959 | Woodard et al. ............. | 106/90 |
| 3,094,425 A | 6/1963 | Adams et al. ................ | 106/90 |
| 3,329,517 A | 7/1967 | Dodson et al. ............... | 106/90 |
| 3,467,193 A | 9/1969 | Messenger .................. | 166/292 |
| 3,607,326 A | 9/1971 | Serafin ........................ | 106/90 |
| 3,615,785 A | 10/1971 | Moorer et al. ............... | 106/314 |
| 4,097,423 A | 6/1978 | Dieterich .............. | 260/2.5 AK |
| 4,110,225 A | 8/1978 | Cagle ..................... | 252/8.5 LC |
| 4,255,276 A | 3/1981 | Fahn et al. .................. | 252/184 |
| 4,264,698 A * | 4/1981 | Takayama et al. .......... | 430/109 |
| 4,386,963 A | 6/1983 | Lange ........................ | 106/117 |
| 4,482,381 A | 11/1984 | Spitz et al. .................. | 106/90 |
| 4,505,751 A | 3/1985 | Sydansk ...................... | 106/84 |
| 4,643,362 A | 2/1987 | Serafin ........................ | 241/16 |
| 4,711,401 A | 12/1987 | Serafin ........................ | 241/16 |
| RE32,742 E | 9/1988 | Skjeldal ...................... | 106/98 |
| 4,960,740 A | 10/1990 | House et al. ................ | 501/148 |
| 5,125,455 A | 6/1992 | Harris et al. ................ | 166/292 |
| 5,149,370 A | 9/1992 | Olaussen et al. ............ | 106/737 |
| 5,207,832 A | 5/1993 | Baffreau et al. ............. | 106/727 |
| 5,275,654 A | 1/1994 | Cowan ....................... | 106/661 |
| 5,294,255 A | 3/1994 | Smetana et al. ............. | 106/698 |
| 5,327,968 A | 7/1994 | Onan et al. .................. | 166/293 |
| 5,346,012 A | 9/1994 | Heathman et al. .......... | 166/293 |
| 5,352,277 A | 10/1994 | Sasaki ........................ | 106/6 |
| 5,375,660 A | 12/1994 | Wehunt ...................... | 166/271 |
| 5,387,283 A | 2/1995 | Kirkpatrick et al. ........ | 106/709 |
| 5,429,675 A | 7/1995 | Cheung et al. .............. | 106/802 |
| 5,447,197 A | 9/1995 | Rae et al. .................... | 166/293 |
| 5,472,501 A | 12/1995 | Dastol ........................ | 106/823 |
| 5,536,310 A | 7/1996 | Brook et al. ................. | 106/708 |
| 5,547,506 A | 8/1996 | Rae et al. .................... | 106/730 |
| 5,549,745 A | 8/1996 | Langenohl et al. .......... | 106/692 |
| 5,556,458 A | 9/1996 | Brook et al. ................. | 106/708 |
| 5,587,012 A | 12/1996 | Montgomery ............... | 106/823 |
| 5,588,990 A | 12/1996 | Dongell ...................... | 106/716 |
| 5,672,203 A | 9/1997 | Chatterji et al. ............. | 106/808 |
| 5,733,819 A | 3/1998 | Kodama et al. ............. | 438/692 |
| 5,769,939 A | 6/1998 | Dingoyr et al. .............. | 106/737 |
| 5,783,489 A | 7/1998 | Kaufman et al. ............. | 38/692 |
| 5,814,145 A | 9/1998 | Dugat et al. ................. | 106/737 |
| 5,820,670 A | 10/1998 | Chatterji et al. ............. | 106/727 |
| 5,968,255 A | 10/1999 | Mehta et al. ................ | 106/724 |
| 5,972,103 A | 10/1999 | Mehta et al. ................ | 106/728 |
| 5,989,336 A | 11/1999 | Carpenter et al. ........... | 106/811 |
| 6,086,669 A | 7/2000 | Patkar et al. ................ | 106/491 |
| 6,245,142 B1 * | 6/2001 | Reddy et al. ................ | 106/724 |

FOREIGN PATENT DOCUMENTS

| | | | |
|---|---|---|---|
| EP | 0 249 408 A1 | | 12/1987 |
| EP | 314242 | | 5/1989 |
| EP | 466646 A | * | 1/1992 |
| EP | 0 507 368 A1 | | 10/1992 |
| JP | 07059846 A | * | 3/1995 |
| JP | 09048816 A | * | 2/1997 |
| NL | 7201502 A | * | 8/1973 |
| SU | 1234845 A | | 6/1986 |
| WO | WO-9858628 A | * | 12/1998 |
| WO | WO 99/28264 | | 10/1999 |

OTHER PUBLICATIONS

"Evaluation of factors affecting lipid binding in wheat flours" Pomeranz et al., J Agr Food Chem (1968) 16(6), pp. 974–978.*

"Thin layer silica gel chromatography of tissue lipids in meat" Yakubov et al. Myas. Ind. SSSR (1973), (6), p.34–6.*

"Study of Flue–Dust–Containing Thermostable Cementing Materials of Reduced Specific Gravity" by Banyasz, Kohasz; Lapok, Koolaj Foldaz (1980) pp. 129–134. (Abstract only).

Concrete Admixtures Handbook Properties, Science, and Technology (pp. 518–521) by V.S. Ramachandran (No date available).

Japan Patent Abstract JP 10 212146 A dated Nov. 30, 1998.

Chemical Abstract XP 000183781 entitled: Cement Products With Early Strength, dated Jul. 15, 1985.

Chemical Abstract XP 002137033 entitled: Concrete Mix Using Coarse Carbonate Filler—Is Obt. By Treating Filler With Aq. Acetic Acid, And Stirring With Cement And Sand.

* cited by examiner

*Primary Examiner*—Paul Marcantoni
(74) *Attorney, Agent, or Firm*—Craig W. Roddy; C. Clark Dougherty, Jr.

(57) ABSTRACT

Methods of improving the flow properties of at least one dry particulate cementitious or non-cementitious material are provided. The methods are basically comprised of dry-blending a particulate flow enhancing additive comprised of a particulate solid absorbent material having a flow inducing polar molecule producing chemical absorbed thereon with said cementitious or non-cementitious material.

17 Claims, No Drawings

FLOW PROPERTIES OF DRY CEMENTITIOUS AND NON-CEMENTITIOUS MATERIALS

CROSS-REFERENCE TO RELATED APPLICATION

This application is a continuation-in-part of application Ser. No. 09/229,245 filed Jan. 12, 1999, now U.S. Pat. No. 6,245,142.

BACKGROUND OF THE INVENTION

1. Field of the Invention

The present invention provides methods of improving the flow properties of dry particulate cementitious or non-cementitious materials whereby the materials can be readily conveyed out of storage tanks and the like.

2. Description of the Prior Art

Cementitious materials such as hydraulic cements, slag, and fly ash and non-cementitious materials such as barite, bentonite and fumed silica having various particle size distributions are often dry-blended and placed in storage tanks. The storage tanks containing the cementitious and non-cementitious materials are also often transported by land or sea to locations where the materials are to be used. During such transportation, the materials are subjected to vibrations and as a result, the materials are tightly packed under static conditions. One or more of the materials are often of ultra-fine particle sizes, i.e., sizes in the range of from about 5 to about 100 microns, which causes the tightly packed problem to be more severe. When the cementitious or non-cementitious materials are conveyed out of the storage tanks at the locations of use, significant portions of the tightly packed materials are often left in the storage tanks. The incomplete conveying of the materials results in costs for disposing of the materials and increased costs to the person or entity using the materials.

Cementitious and other non-cementitious mineral materials have heretofore been treated to make them more flowable. For example, U.S. Pat. No. 2,857,286 issued to Striker on Oct. 21, 1958 discloses a process of treating Portland cement with acetic acid or a water soluble salt of acetic acid whereby the Portland cement becomes more flowable. In accordance with the Striker patent, the treatment of Portland cement with the acid or acetate is carried out either concurrently with, or subsequent to, the grinding of the cement clinker. The acid or acetate can be combined with the cement during grinding or the ground cement can be treated by injecting the acid or acetate into the cement under pressure as a vapor in order to blow the cement and uniformly contact it with the acid or acetate.

U.S. Pat. No. 3,094,425 issued to Adams et al. on Jun. 18, 1963 discloses that most cements and similar materials compacted by vibration become semi-rigid and will not flow without considerable mechanical effort to break up the compaction. This condition is known as "pack set." Further, it is stated that it is known that certain polar molecules when added to ground cement will attach to the particles and reduce their surface forces. In accordance with the Adams patent, a mixture of calcium acetate and lignin sulfonate is an effective grinding aid and a pack set inhibitor when interground with a cement or other similar material.

U.S. Pat. No. 3,615,785 issued to Moorer et al. on Feb. 2, 1968 discloses a cement grinding aid and pack set inhibitor comprised of polyol and a water soluble salt of an aliphatic acid having no more than 3 carbon atoms.

The above described additives are difficult to handle and must be added to the cement prior to or after grinding. Since commercially available cementitious and non-cementitious materials generally do not include such additives, they must be provided, handled and combined with the cementitious or non-cementitious materials by the user by spraying, mechanical mixing or other time consuming procedure.

Thus, there are continuing needs for improved methods of enhancing the flow properties of dry cementitious and non-cementitious particulate materials which are stored and/or transported in storage tanks.

SUMMARY OF THE INVENTION

The present invention provides improved methods of enhancing the flow properties of a dry particulate cementitious or non-cementitious material or a blend of such materials which meet the needs described above and overcome the deficiencies of the prior art. The methods basically comprise dry-blending a particulate flow enhancing additive comprised of a particulate solid adsorbent material having a flow inducing chemical adsorbed thereon with a cementitious or non-cementitious material prior to placing the material in a storage tank.

The particulate flow enhancing additive of this invention is easily handled, readily dry blended with cementitious or non-cementitious materials and enhances the flow properties of the materials. The presence of the flow enhancing additive in the cementitious or non-cementitious materials allows the materials to be mechanically or pneumatically conveyed out of storage tanks, even when they are tightly packed therein, without leaving significant portions of the materials in the storage tanks.

A preferred particulate flow enhancing additive useful in accordance with this invention is comprised of precipitated silica powder having a flow inducing chemical comprised of glacial acetic acid adsorbed thereon. The weight ratio of precipitated silica powder to the glacial acetic acid in the flow enhancing additive is in the range of from about 90:10 to about 10:90, and the additive is blended with cementitious or non-cementitious materials in an amount in the range of from about 0.01% to about 1.0% by weight of the cementitious or non-cementitious materials.

It has also been discovered that after dry-blending a cementitious or non-cementitious material such as barite with the flow enhancing additive of this invention and placing the resulting blend in a storage tank, if the tank is closed to the atmosphere and the blend is aged in the closed storage tank for a time period in the range of from about one half day to about four days, the particulate blend is more readily and easily conveyed out of the storage tank.

It is, therefore, a general object of the present invention to provide improved methods of enhancing the flow properties of dry particulate cementitious and non-cementitious materials.

Other and further objects, features and advantages of the present invention will be readily apparent to those skilled in the art upon a reading of the description of preferred embodiments which follows.

DESCRIPTION OF PREFERRED EMBODIMENTS

The present invention provides methods of improving the flow properties of one or more dry particulate cementitious or non-cementitious materials. Examples of the cementitious materials include, but are not limited to, hydraulic cements, slag, fly ash and mixtures thereof. Examples of non-cementitious materials include, but are not limited to, barite, bentonite and fumed silica.

The methods of this invention are particularly suitable for improving the flow properties of a dry particulate cementitious or non-cementitious material or a blend of such materials which are of fine or ultra-fine particle size and are tightly packed under static conditions in a storage tank from which they must be conveyed. This invention also provides methods of storing one or more dry particulate cementitious or non-cementitious materials in a storage tank, transporting the storage tank and cementitious or non-cementitious materials therein to a location of use and then conveying the cementitious or non-cementitious materials out of the storage tank without unintentionally leaving a significant portion of the cementitious or non-cementitious materials in the storage tank. The term "significant portion" is used herein to mean a portion of the stored cementitious or non-cementitious material that is above about 15% thereof by volume.

The methods of this invention are basically comprised of dry-blending a particulate flow enhancing additive comprised of a particulate solid adsorbent material having a flow inducing chemical adsorbed thereon with at least one particulate cementitious or non-cementitious material. Thereafter, the blend of the cementitious or non-cementitious material and flow enhancing additive can be placed in a storage tank and readily conveyed therefrom, either mechanically or pneumatically, without leaving a significant portion of the cementitious or non-cementitious material in the storage tank.

It has also been discovered that after dry-blending a cementitious or non-cementitious material such as barite with the flow enhancing additive of this invention and placing the resulting blend in a storage tank, if the tank is closed to the atmosphere and the blend is aged in the closed storage tank for a time period in the range of from about one half a day to about four days, the particulate blend is more readily and easily conveyed out of the storage tank.

A variety of particulate solid adsorbent materials can be utilized for forming the flow enhancing additive of this invention. Examples of such adsorbent materials include, but are not limited to, precipitated silica, zeolite, talcum, diatomaceous earth and fuller's earth. Of these, precipitated silica is presently preferred. The adsorbent material utilized must be capable of adsorbing the flow inducing chemical utilized, and remain as a free flowing powder.

The flow inducing chemical utilized in accordance with this invention can be any of the heretofore known chemicals which produce polar molecules that react with particulate materials and increase their flow properties. Examples of polar molecule producing chemicals which can be utilized include, but are not limited to, organic acids such as alkyl and/or alkene carboxylic acids and sulfonic acids, salts of the foregoing acids formed with weak bases and acid anhydrides such as sulfur dioxide, carbon dioxide, sulfur trioxide, nitrogen oxides and similar compounds. The most preferred flow including chemical for use in accordance with this invention is glacial acetic acid. While the exact cause for the flow enhancement of particulate cementitious or non-cementitious materials when contacted with a flow inducing chemical of this invention is presently unknown, it is believed that polar molecules of the chemical react with components of the cementitious or non-cementitious materials such as tricalcium silicate to produce a particle repulsion effect in the materials.

The weight ratio of the particulate solid adsorbent material utilized to the flow inducing chemical utilized in the flow enhancing additive is generally in the range of from about 90:10 to about 10:90, more preferably from about 75:25 to about 25:75. The resulting particulate flow enhancing additive is dry-blended with at least one particulate cementitious or non-cementitious material, the flow properties of which are to be improved, in an amount in the range of from about 0.01% to about 1.0% by weight of the cementitious or non-cementitious material, more preferably in an amount in the range of from about 0.02% to about 0.5%.

A method of the present invention for improving the flow properties of at least one dry particulate cementitious or non-cementitious material is comprised of dry-blending a particulate flow enhancing additive with the cementitious or non-cementitious material, the additive being comprised of a particulate solid adsorbent material having a flow inducing polar molecule producing chemical adsorbed thereon.

Another method of the present invention for improving the flow properties of at least one dry particulate cementitious or non-cementitious material is comprised of dry-blending a particulate flow enhancing additive with the cementitious or non-cementitious material in an amount in the range of from about 0.01% to about 1.0% by weight of the cementitious or non-cementitious material, the additive being comprised of a particulate solid adsorbent material having a flow inducing chemical adsorbed thereon selected from the group of polar molecule producing organic acids, their salts and acid anhydrides.

Yet another method of the present invention for improving the flow properties of at least one dry particulate cementitious or non-cementitious material is comprised of dry-blending with the cementitious or non-cementitious material a particulate flow enhancing additive comprised of a particulate solid adsorbent material selected from the group of precipitated silica, zeolite and talcum having a flow inducing chemical adsorbed thereon selected from the group of polar molecule producing organic acids, their salts and acid anhydrides, the weight ratio of the solid adsorbent material to the flow inducing chemical being in the range of from about 90:10 to about 10:90 and the flow enhancing additive being blended with the cementitious or non-cementitious material in an amount in the range of from about 0.01% to about 1.0% by weight of the cementitious or non-cementitious material.

Still another method of this invention for improving the flow properties of at least one dry particulate cementitious or non-cementitious material is comprised of dry-blending a particulate flow enhancing additive with the cementitious or non-cementitious material, the additive being comprised of precipitated silica powder having a flow inducing chemical comprised of glacial acetic acid adsorbed thereon, the weight ratio of precipitated silica powder to glacial acetic acid being in the range of from about 75:25 to about 25:75 and the flow enhancing additive being blended with the cementitious or non-cementitious material in an amount in the range of from about 0.02% to about 0.5% by weight of the cementitious or non-cementitious material.

A method of this invention for placing at least one dry particulate cementitious or non-cementitious material in a storage tank, transporting the storage tank and cementitious or non-cementitious material to a location of use and then conveying the cementitious or non-cementitious material out of the storage tank without unintentionally leaving a significant portion of the cementitious or non-cementitious material in the storage tank is comprised of dry-blending a particulate flow enhancing additive with the cementitious or non-cementitious material prior to placing the material in the storage tank and then placing the resultant blend of additive and cementitious or non-cementitious material in the storage tank, the additive being comprised of a particulate solid adsorbent material having a flow inducing polar molecule producing chemical adsorbed thereon; preferably a flow inducing polar molecule producing chemical selected from the group of organic acids, their salts and acid anhydrides.

Another method of this invention for placing at least one dry particulate cementitious or non-cementitious material in a storage tank, transporting the storage tank and cementitious or non-cementitious material to a location of use and then conveying the cementitious or non-cementitious material out of the storage tank without unintentionally leaving a significant portion of the cementitious or non-cementitious material in the storage tank is comprised of prior to placing the cementitious or non-cementitious material in the storage tank, dry-blending with the cementitious or non-cementitious material a particulate flow enhancing additive and then placing the resultant blend of additive and cementitious or non-cementitious material in the storage tank, the additive being comprised of a particulate solid adsorbent material selected from the group of precipitated silica, zeolite and talcum having a flow inducing polar molecule producing chemical adsorbed thereon selected from the group of organic acids, salts thereof and acid anhydrides, the weight ratio of the solid adsorbent material to the flow inducing chemical being in the range of from about 90:10 to about 10:90 and the flow enhancing additive being blended with the cementitious or non-cementitious material in an amount in the range of from about 0.01% to about 1.0% by weight of the cementitious or non-cementitious material.

Yet another method of this invention for placing at least one particulate cementitious or non-cementitious material in a storage tank, transporting the storage tank and cementitious or non-cementitious material to a location of use and then conveying the cementitious or non-cementitious material out of the storage tank without unintentionally leaving a significant portion of the cementitious or non-cementitious material in the storage tank is comprised of: (a) dry-blending a particulate flow enhancing additive with the cementitious or non-cementitious material prior to placing the cementitious or non-cementitious material in the storage tank and (b) placing the resultant blend of additive and cementitious or non-cementitious material in the storage tank; the additive being comprised of precipitated silica powder having a flow inducing additive comprised of glacial acetic acid adsorbed thereon, the weight ratio of precipitated silica powder to glacial acetic acid being in the range of from about 75:25 to about 25:75 and the flow enhancing additive being blended with the cementitious or non-cementitious material in an amount in the range of from about 0.02% to about 0.5% by weight of the cementitious or non-cementitious material.

Still another method of placing at least one dry particulate cementitious or non-cementitious material in a storage tank, transporting the storage tank and cementitious or non-cementitious material to a location of use and then conveying the cementitious or non-cementitious material out of the storage tank without unintentionally leaving a significant portion of the cementitious or non-cementitious material in the storage tank is comprised of: (a) dry blending a particulate flow enhancing additive with the cementitious or non-cementitious material prior to placing the cementitious or non-cementitious material in the storage tank; (b) placing the resulting blend of additive and cementitious or non-cementitious material in the storage tank; (c) closing the storage tank to the atmosphere; (d) aging the blend of additive and cementitious or non-cementitious material in the closed storage tank for a time period in the range of from about one half a day to about 4 days; (e) opening the storage tank; and (f) conveying the blend of additive and cementitious or non-cementitious material out of the storage tank; the additive being comprised of precipitated silica powder having glacial acetic acid adsorbed thereon.

In order to further illustrate the methods of the present invention, the following examples are given.

EXAMPLE 1

Several cement blends were prepared as shown in Table I below.

TABLE I

Test Cement Blends

| Blend No. | API Portland Cement, lb/sack of Cement | 2 parts:1 part by wt. Portland Cement - Ultra Fine Cement Mixture | 50%—50% Mixture of Ultra-Fine Cement and Ultra-Fine Fly Ash, % by Weight of Compostion | Fumed Silica, lb/sack of Cement | Class F Pozzolan, lb/sack of Cement | Calcium Chloride, % by Weight of Cement | Particulate Crystalline Silica, % by Weight of Composition |
|---|---|---|---|---|---|---|---|
| 1 | 47 | — | — | 18.5 | 18.5 | 1 | — |
| 2 | — | — | 65 | — | — | — | 35 |
| 3 | — | 98 | — | — | — | 2 | — |

The cement blends were each tested by placing a volume of each blend sufficient to achieve a packed thickness of approximately ¾" in a 200 ml flask. The cement blend was swirled in the flask until a level cement surface was produced. The flask containing the cement blend was then placed on a vibrator and vibrated for the time period indicated in Table II below. The vibrator was an FMC Syntron Jogger, Model J-1, 115 Volts/60 Hz/1 AMP equipped with a PowerStat voltage regulator. After being vibrated, the flask containing the cement blend was removed from the vibrator and placed on a rotator for slowly rotating the flask in a horizontal plane and counting the number of rotations. The flask was rotated for the number of counts required for the cement blend in the flask to decompact therein. After the cement blend decompacted, the flask and cement blend were vigorously shaken and the cement blend was swirled for 5 seconds whereupon the test was repeated. This procedure was followed for a total of five tests or until consistent results were observed.

The above described tests were repeated at a number of higher and lower vibration frequencies (as indicated by the voltage set on the voltage regulator) and for different times until a maximum average count was determined. The results of these tests are set forth in Table II below.

TABLE II

Maximum Average Rotator Counts

|  | Blend No. 1 | Blend No. 2 | Blend No. 3 |
|---|---|---|---|
| Vibrator Voltage, volts | 54 | 56 | 54 |
| Vibration Time, seconds | 20 | 25 | 20 |
|  | Rotator Counts | | |
| 1st Test | 36 | 30 | 30 |
| 2nd Test | 31 | 22 | 36 |
| 3rd Test | 33 | 31 | 27 |
| 4th Test | 41 | 26 | 36 |
| 5th Test | 21 | 29 | 38 |
| 6th Test | 37 | — | — |
| Average Count | 33.2 | 27.6 | 33.4 |

EXAMPLE 2

The cement blends described in Example 1 were combined with varying amounts of the flow enhancing additive of the present invention. The additive was comprised of precipitated silica powder and glacial acetic acid having a weight ratio of silica to acid of 1:1. The results of these tests are set forth in Table III below.

TABLE III

Test Rotator Counts When Flow Enhancing Additive Included In Cement Blends

|  | Blend No. 1 | Blend No. 2 | Blend No. 3 |
|---|---|---|---|
| Vibrator Voltage, volts | 54 | 56 | 54 |
| Vibration Time, seconds | 20 | 25 | 20 |
| Quantity of Additive, % by wt. of Blend | Rotator Counts | | |
| 0 | 33.2 | 27.6 | 33.4 |
| 0.05 | 15.6 | 10.8 | 26.6 |
| 0.075 | 15 | 9 | 20.4 |
| 0.1 | — | 7.8 | 11.6 |
| 0.125 | — | 5 | 9.2 |
| 0.15 | — | 6 | 6.6 |
| 0.175 | — | — | 4.2 |

As can be seen from the test results given in Table III, the addition of the additive of this invention to the cement blends resulted in significant flow enhancement.

EXAMPLE 3

The test procedure described in Example 1 above was repeated utilizing a particulate non-cementitious material, i.e., barite, instead of cementitious materials. At a vibrator voltage of 64 volts and a vibration time of 40 seconds, the rotator counts were in the range of from 18 to 26. The average of 7 tests was 16.9 counts/21.4 counts wherein the first number of counts is required for the packed particulate material to begin releasing from the sides of the flask while being rotated in the horizontal position and the second number of counts is when the particulate material has completely released from the sides of the flask.

Barite was next combined with an additive of the present invention comprised of a 1:1 weight ratio of precipitated silica and glacial acidic in amounts of 0.05% and 0.1% by weight of the barite. In addition, to verify that the improvement in the flow of the barite was not caused by the precipitated silica alone, precipitated silica was combined with barite in amounts of 0.05% and 0.1% by weight of the barite. The barite and additive blends were then tested for rotator counts. The results of these tests are set forth in Table IV below.

TABLE IV

Barite Rotator Count Tests At 64 Volts And 60 Seconds

| Amount of Additive, % by weight of barite | Rotator Counts, release begins/release complete |
|---|---|
| None | 17/21.4 |
| 0.05[1] | 8.4/12 |
| 0.1[1] | 5.4/7 |
| 0.05[2] | 15.4/20 |
| 0.1[2] | 16.4/21.6 |

[1]1.1 weight ratio of precipitated silica and glacial acetic acid
[2]Precipitated silica only From Table IV it can be seen that the addition of the additive of this invention to barite resulted in significant flow enhancement and that precipitated silica alone does not provide flow enhancement.

EXAMPLE 4

Two portions of barite were blended with different amounts of an additive of this invention comprised of precipitated silica and glacial acidic acid in a 1:1 weight ratio. Test samples of the resulting blends were tested for rotator counts before and after being aged for 4 days and 8 days. Some of the samples were exposed to the atmosphere during aging while others were closed to the atmosphere during aging. The results of these tests are set forth in Table V below.

TABLE V

Barite Rotator Count Tests At 64 Volts And 60 Seconds

| Open to Atmosphere | | | Closed to Atmosphere | | |
|---|---|---|---|---|---|
| Additive Amount, % by wt. barite | Aging Time, days | Rotator Counts, release begins/ release complete | Additive Amount, % by wt. barite | Aging Time, days | Rotator Counts, release begins/ release complete |
| None | None | 28.8/30.7 | None | None | 28.8/30.7 |
| 0.05 | None | 16.8/17.8 | 0.05 | None | 16.8/17.8 |
| 0.05 | 4 | 16.8/17.7 | 0.05 | 4 | 14/15 |
| 0.05 | 8 | 21/22 | 0.05 | 8 | 16.8/18.2 |

TABLE V-continued

Barite Rotator Count Tests At 64 Volts And 60 Seconds

| Open to Atmosphere | | | Closed to Atmosphere | | |
|---|---|---|---|---|---|
| Additive Amount, % by wt. barite | Aging Time, days | Rotator Counts, release begins/ release complete | Additive Amount, % by wt. barite | Aging Time, days | Rotator Counts, release begins/ release complete |
| None | None | 19.2/20 | None | None | 19.2/20 |
| 0.07 | None | 16/17.2 | 0.07 | None | 16/17.2 |
| 0.07 | 4 | 15.6/18.9 | 0.07 | 4 | 14.8/16.4 |
| 0.07 | 8 | 20.8/22.4 | 0.07 | 8 | 15.2/16.4 |

From Table V, it can be seen that by aging the barite test samples treated with the additive of this invention in a container closed to the atmosphere for from 4 days to 8 days, the flow enhancement of the samples was increased.

EXAMPLE 5

The test procedure described in Example 3 above was repeated utilizing 45 grams of fumed silica, a particulate non-cementitious material. At a vibrator voltage of 65 volts and vibration time of 25 seconds, the rotator counts were in the range of from 9 to 18. The average of five tests was 8.8 counts/18.8 wherein the first number of counts is required for the packed particulate material to begin releasing from the sides of the flash while being rotated in the horizontal position, and the second number of counts is when the particulate material has completely released from the sides of the flash.

Fumed silica was next combined with different levels of the additive as described in Example 3, and the blends were tested for rotator counts. The results of these tests are set forth in Table VI below.

TABLE VI

Fumed Silica Rotator Count Tests at 65 volts and 25 seconds

| Amount of Additive, % by weight of fumed silica | Rotator Counts, Release begins/release complete |
|---|---|
| None | 8.8/18.8 |
| 0.05 | 6.4/14.8 |
| 0.09 | 5.7/11.7 |
| 0.13 | 3.2/7.4 |

From Table VI, it can be seen that the addition of the additive of this invention to fumed silica resulted in significant flow enhancement.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of improving the flow properties of at least one dry particulate non-cementitious material comprising dry-blending a particulate flow enhancing additive with said non-cementitious material, said additive being comprised of a particulate solid adsorbent material having a flow inducing polar molecule producing chemical adsorbed thereon;

wherein said flow inducing chemical is selected from the group consisting of polar molecule producing organic acids, their salts and acid anhydrides;

wherein the weight ratio of said solid adsorbent material to said flow inducing chemical in said flow enhancing additive is in the range of from about 90:10 to about 10:90; and wherein said flow enhancing additive is blended with said non-cementitious material in an amount in the range of from about 0.01% to about 1.0% by weight of said non-cementitious material.

2. The method of claim 1 wherein said solid adsorbent material is selected from the group consisting of precipitated silica, zeolite, talcum, diatomaceous earth and fuller's earth.

3. The method of claim 1 wherein said non-cementitious material is selected from the group consisting of barite, bentonite and fumed silica.

4. The method of claim 1 wherein said solid absorbent material is precipitated silica powder and said flow inducing chemical is glacial acetic acid.

5. The method of claim 4 wherein the weight ratio of said precipitated silica to said glacial acetic acid in said flow enhancing additive is in the range of from about 75:25 to about 25:75.

6. The method of claim 5 wherein said flow enhancing additive is blended with said non-cementitious material in an amount in the range of from about 0.02% to about 0.5% by weight of said non-cementitious material.

7. A method of placing at least one dry particulate non-cementitious material in a storage tank, transporting the storage tank and non-cementitious material to a location of use and then conveying the non-cementitious material out of the storage tank without unintentionally leaving a significant portion of the non-cementitious material in the storage tank comprising:

(a) dry-blending a particulate flow enhancing additive with said non-cementitious material prior to placing said non-cementitious material in said storage tank; and (b) placing the resultant blend of additive and non-cementitious material in said storage tank; said additive being comprised of a particulate solid adsorbent material having a flow inducing polar molecule producing chemical selected from the group of polar molecule producing organic acids, their salts and acid anhydrides adsorbed thereon wherein the weight ratio of said solid adsorbent material to said flow inducing chemical in said flow enhancing additive is in the range of from about 90:10 to about 10:90; and wherein said flow enhancing additive is blended with said non-cementitious material in an amount in the range of from about 0.01% to about 1.0% by weight of said non-cementitious material.

8. The method of claim 7 wherein said non-cementitious material is pneumatically conveyed out of said storage tank.

9. The method of claim 7 which further comprises the steps of closing said storage tank to the atmosphere after dry-blending said additive with said non-cementitious material and placing said blend of additive and non-cementitious material in said storage tank, and then aging said blend in said closed storage tank for a time period in the range of from about one half a day to about four days before opening said storage tank and conveying said blend out of said storage tank.

10. The method of claim 7 wherein said solid adsorbent material is selected from the group consisting of precipitated silica, zeolite, talcum, diatomaceous earth and fuller's earth.

11. The method of claim 7 wherein said solid adsorbent material is precipitated silica powder and said flow inducing chemical is glacial acetic acid.

12. The method of claim 7 wherein said non-cementitious material is selected from the group consisting of barite, bentonite and silica.

13. A method of placing at least one dry particulate cementitious or non-cementitious material in a storage tank, transporting the storage tank and non-cementitious material to a location of use and then conveying the non-cementitious material out of the storage tank without unintentionally leaving a portion of the cementitious or non-cementitious material in the storage tank comprising the steps of:
(a) dry-blending a particulate flow enhancing additive with said cementitious or non-cementitious material prior to placing said non-cementitious material in said storage tank;
(b) placing the resulting blend of additive and cementitious or non-cementitious material in said storage tank said additive being comprised of a particulate solid adsorbent material have a flow inducing polar molecule producing chemical selected from the group of polar molecule producing organic acids, their salts and acid anhydrides adsorbed thereon wherein the weight ratio of said solid adsorbent material to said flow inducing chemical in said flow enhancing additive is in the range of from about 90:10 to about 10:90; and wherein said flow enhancing additive is blended with said non-cementitious material in an amount in the range of from about 0.01% to about 1.0% by weight of said non-cementitious material;
(c) closing said storage tank to the atmosphere;
(d) aging said blend of additive and cementitious or non-cementitious material in said closed storage tank for a time period in the range of from about one half a day to about four days;
(e) opening said storage tank; and
(f) conveying said blend of additive and cementitious or non-cementitious material out of said storage tank.

14. The method of claim 13 wherein said cementitious or non-cementitious material is pneumatically conveyed out of said storage tank.

15. The method of claim 13 wherein said solid adsorbent material is selected from the group consisting of precipitated silica, zeolite, talcum, diatomaceous earth and fuller's earth.

16. The method of claim 13 wherein said solid adsorbent material is precipitated silica powder and said flow inducing chemical is glacial acetic acid.

17. The method of claim 13 wherein said cementitious or non-cementitious material is selected from the group consisting of barite, bentonite and fumed silica.

* * * * *